United States Patent [19]

Nordstrom

[11] Patent Number: 4,878,635
[45] Date of Patent: * Nov. 7, 1989

[54] CARGO HANDLING SYSTEM

[75] Inventor: Arnold Nordstrom, Fallbrook, Calif.

[73] Assignee: Ancra Corporation, Hawthorne, Calif.

[*] Notice: The portion of the term of this patent subsequent to Feb. 21, 2006 has been disclaimed.

[21] Appl. No.: 261,784

[22] Filed: Oct. 24, 1988

Related U.S. Application Data

[63] Continuation-in-part of Ser. No. 39,709, Apr. 20, 1987, Pat. No. 4,805,852.

[51] Int. Cl.$^4$ .................................................. B64C 1/22
[52] U.S. Cl. ............................. 244/137.1; 244/118.1;
    414/521; 414/352; 414/512; 410/128; 410/130;
    410/132; 410/135; 410/139
[58] Field of Search ................ 414/352, 502, 512, 516,
    414/521, 532, 679; 410/121, 132, 128–130, 135,
    139; 244/137.1, 118.1, 118.6

[56] References Cited

U.S. PATENT DOCUMENTS

| | | | |
|---|---|---|---|
| 3,337,066 | 8/1967 | Reed et al. | 414/502 |
| 3,572,563 | 3/1971 | Oliver | 414/679 |
| 3,612,316 | 10/1971 | Baldwin | 244/137.1 |
| 3,756,544 | 9/1973 | Bader | 244/137.1 |
| 4,805,852 | 2/1989 | Nordstrom | 414/352 |

Primary Examiner—Joseph F. Peters, Jr.
Assistant Examiner—Anne Sartelle
Attorney, Agent, or Firm—Edward A. Sokolski

[57] ABSTRACT

A cargo handling system has a main drive panel and fore and aft end panels for driving cargo in one direction or the other in the cargo compartment of a vehicle such as an aircraft. The main drive panel is driven in either direction on a plurality of toothed belts which are anchored to the system floor panels, the teeth of such belts engaging the teeth of trolley wheels which are rotatably driven by the motor. The main panel is thus driven in trolly-like fashion along the drive belts in loading cargo. Each end panel is attached to a separate endless chain drive. The chain drives are selectively attached to the main drive panel and one or the other of the end panels drawn along with the main drive panel in the unloading of cargo.

9 Claims, 5 Drawing Sheets

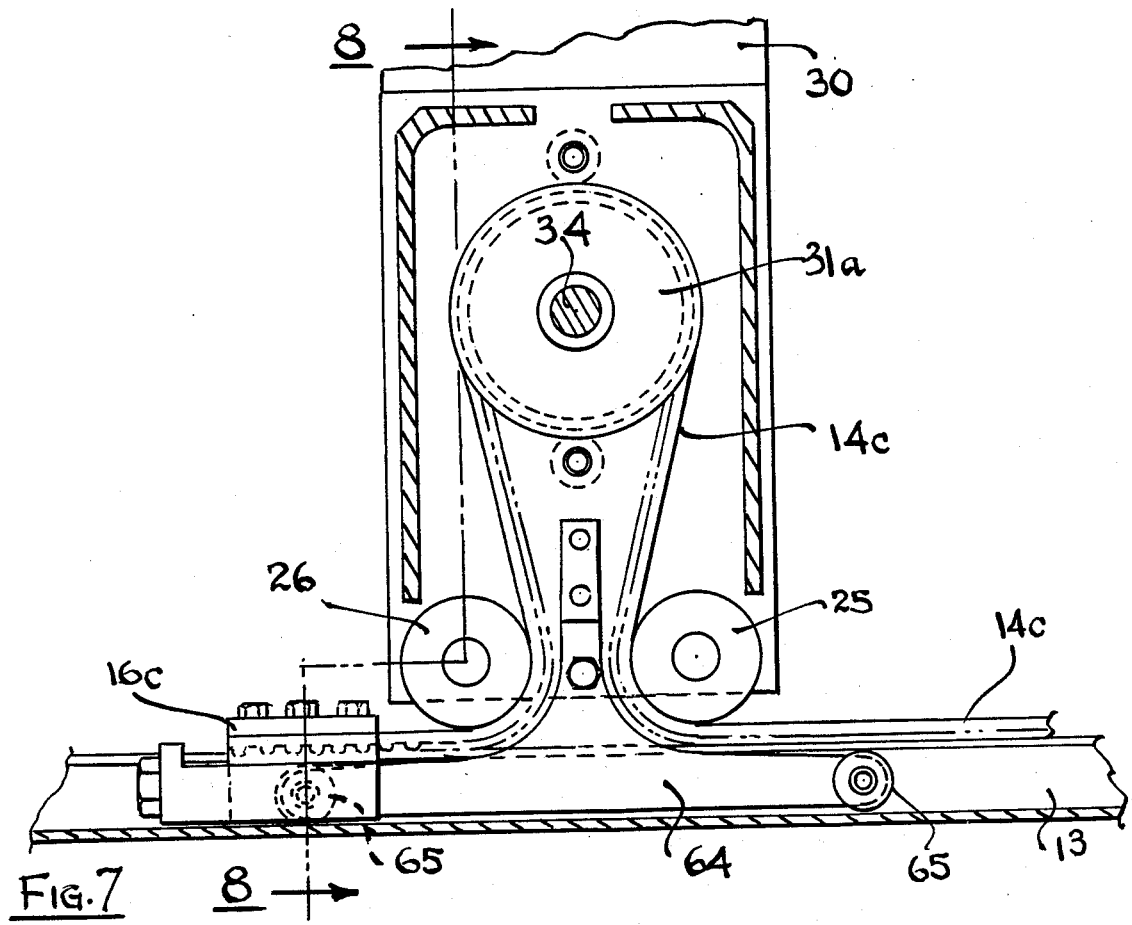
FIG. 7
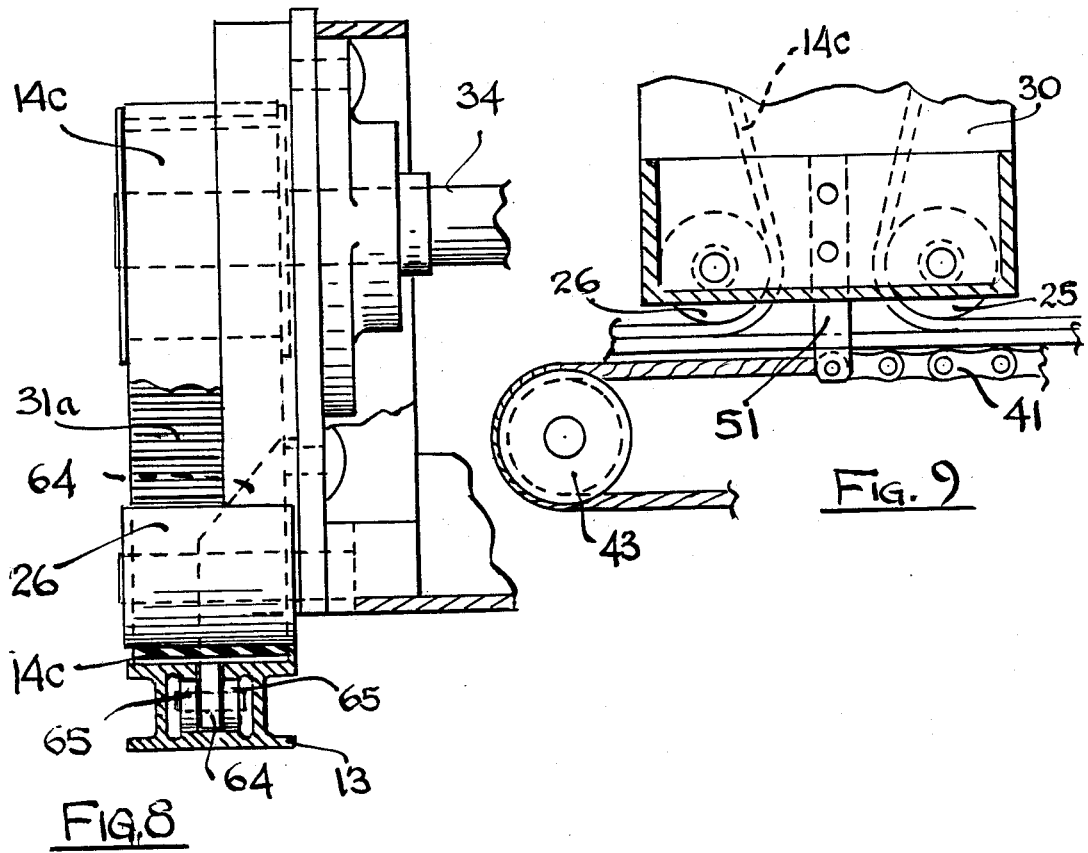
FIG. 8
FIG. 9

CARGO HANDLING SYSTEM

This application is a continuation in part of my application Ser. No. 039,709 filed Apr. 20, 1987 now U.S. Pat. No. 4,805,852.

This invention relates to cargo handling systems and more particularly to such a system employing drive panels for driving cargo along roller panels in loading and unloading a vehicle such as an aircraft.

In my application Ser. No. 039,709 of which the present application is a continuation in part, a system is described for loading and unloading cargo in a vehicle such as an aircraft. In this system a main drive panel and fore and aft end panels are employed to drive the cargo longitudinally along roller panels on the floor of the loading compartment. The panels are driven by means of a cable and pulley arrangement mounted on the main panel, these cables being anchored at their ends and driven back and forth by means of a trolley mechanism. In this system, the end panels are driven as may be desired along with the main panel by selectively attaching the fore and aft end panels to the drive cables for the main drive panel.

The system of application No. 039,709 is believed to constitute an improvement over prior art loading systems including those cited in my prior application which are incorporated herein by reference. Of particular note in this cited prior art are U.S. Pat. Nos. 3,262,588 to Davidson and 3,572,563 to Oliver. The Davidson patent describes a cargo handling system which employs a plurality of roller strips and roller panels mounted in the floor of the vehicle which are of the same general type contemplated for use with the system of the present invention. This reference, however, does not describe a loading and unloading system employing a drive panel structure. U.S. Pat. No. 3,572,563 to Oliver describes a system for loading and unloading cargo which employs pusher plates which are employed to drive the cargo to and from loading positions. This end result is achieved in Oliver by means of an endless chain to which the pushers are selectively manually connected.

The system of the present invention is similar in its basic operation to that of my prior application, the disclosure of which is incorporated herein by reference. The system of the present invention, however, achieves the same functional operations with a much simpler implementation which it is believed will provide more reliable and more maintenance free operation. The improved end results are achieved in the present invention by employing toothed belts along which the main drive panel moves in trolley-like fashion. This driving motion is achieved by means of toothed "trolley" wheels which have teeth which engage the teeth of the belts, these trolley wheels being rotatably driven in either one direction or an opposite direction by means of a drive motor. The belts are anchored at their opposite ends such that the drive panel can ride in either direction along the extent of such belts. The fore and aft end panels are selectively driven along with the main panel by means of a line formed by a chain or cable drive, there being a separate such drive for each end panel. In the preferred embodiment, each such line is formed in an endless loop to which the end panels are fixedly attached and to which the main panel can be selectively attached so that either of the panels can be drawn along with the main panel in unloading cargo. Each of the end panels has an interconnected pair of free-wheeling sprocket trolley wheels which engage the teeth of the outside drive belts. This is to provide directional stabilization for such panels and avoid cocking and binding of the panel trolley.

It is therefore an object of this invention to provide an improved and simplified system for loading and unloading cargo in a vehicle.

It is a further object of this invention to provide a more reliable more maintenance free system employing drive panels for loading and unloading cargo in a vehicle.

Other objects of the invention will become apparent as the description proceeds in connection with the accompanying drawings of which:

FIG. 7 is a cross sectional view in elevation illustrating the free wheeling trolley wheel mechanism of the end panels;

FIG. 8 is a cross sectional view taken along the plane indicated by 8—8 in FIG. 7; and FIG. 9 is a cross sectional view illustrating the attachment of the end panels to the drive chain.

Figure 1:
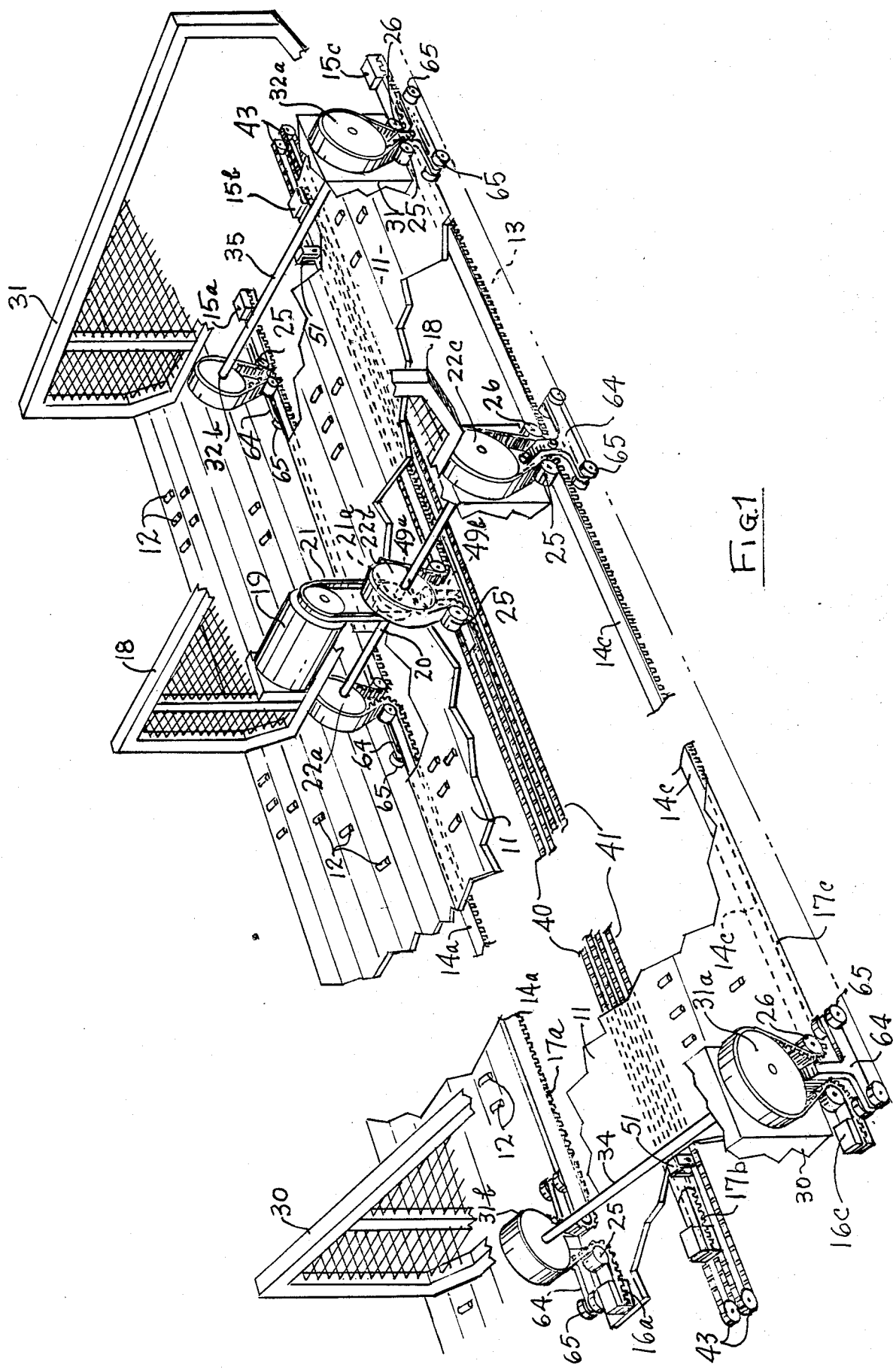
FIG. 1 is a perspective drawing schematically illustrating a preferred embodiment of the invention.

Referring now to FIG. 1 a preferred embodiment of the invention is schematically illustrated. The system floor panels 11 which rest on the floor of the cargo compartment of a vehicle such as an aircraft, have a plurality of rollers 12 mounted across the entire surface thereof for free wheeling rotation. Only a few of these rollers are shown for convenience of illustration. These rollers may be mounted in roller strips or roller panels. Mounted in the panel structure and recessed below the level of rollers 12 are three spaced apart similar belts 14a–14c fabricated of a flexible material such as rubber or a suitable plastic. These belts are anchored teeth down at their opposite ends to the panel structure assembly at anchor points 15a–c and 16a–c. Main drive panel 18 has an electrical motor 19 mounted 8 thereon. Rotatably mounted on drive panel 18 is a drive shaft 20 9 which has a sprocket wheel 21a and trolley wheels 22a–22c fixedly mounted thereon. A pair of idler wheels 25 and 26 are rotatably mounted on main drive panel 18 directly beneath each of trolley wheels 22a–22c. Drive belts 14a–14c have teeth 17a–17c extending therefrom along the entire extent thereof, these teeth engaging mating teeth formed in trolley wheels 22a–22c.

End panels 30 and 31 and main drive panel 18 are each mounted at their opposite ends on support feet 64 which have rollers 65 which run along channels 13. The panels are thus supported for longitudinal movement along the loading compartment floor.

End panels 30 and 31 each has a pair of interconnected toothed trolley wheels, 31a–31b and 32a–32b respectively which are freely mounted for rotation on the end panels on support shafts 34 and 35 respectively. Mounted directly beneath each of wheels 31a–31b, 32a-32b are a pair of free wheeling idler wheels 25 and 26.

An endless sprocket chain 40 which may include a section of cable is mounted beneath floor 11, this chain being mounted for movement in either direction on rotatably supported pulley wheels 43. A similar endless chain 41 is mounted alongside chain 40 beneath floor 11, the second chain being similarly mounted on pulley wheels 43. Chain 40 is attached to panel 31 while chain 41 is attached to panel 30. The opposite ends of the chain are selectively attached to main panel 18 by means of lugs 49 which are actuated in response to solenoids 47a and 47b as to be explained further on in the specification. The belts 14a-14c have their teeth engaged with the teeth of each of the trolley wheels aligned therewith.

Referring now to FIGS. 2-6, the details of the main drive panel and the drive mechanism of the preferred embodiment are illustrated. Sprocket chain 21 is driven by motor 19 and in turn rotatably drives sprocket wheel 21a which is fixedly attached to rotatably mounted drive shaft 20. Toothed trolley wheels 22a-22c are fixedly attached to shaft 20 which rotatably drives the wheels to effect the trolley-like motion of panel 18 along end belts 14a and 14c. The center trolley wheel 22b is wheeling and carries the belt which covers the slots for the chain engagement lugs 49a and b. The main drive panel 18 is thus driven longitudinally along the compartment in either one direction or the opposite direction depending upon the direction of motor 19. It is to be noted that during the loading of cargo, end panels 30 and 31 are in effect "free wheeling" and are pushed by the cargo as the main drive panel drives such cargo against one end panel or the other.

Referring now additionally to FIGS. 7-9 the operation of the system in unloading cargo and the structure of the system for achieving this end result will now be described. For the purposes of illustration, the unloading of cargo by means of end panel 30 will be described. The operation of panel 31 is the same as that for panel 30, only such operation will require motion of the main drive panel in an opposite direction.

Figure 2:
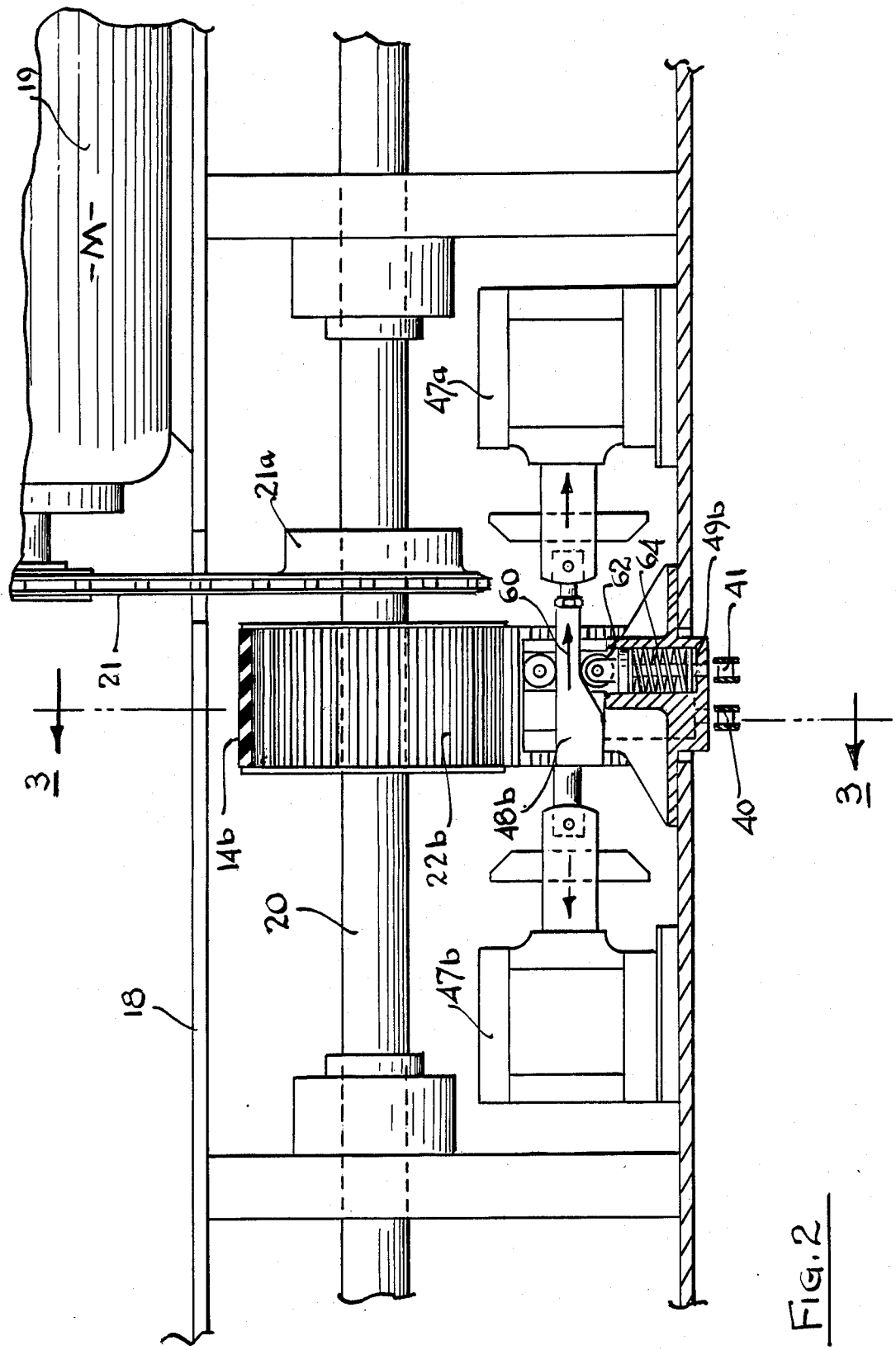
FIG. 2 is a side elevational view with partial cut away section illustrating the main panel drive of the preferred embodiment.
Figure 4:
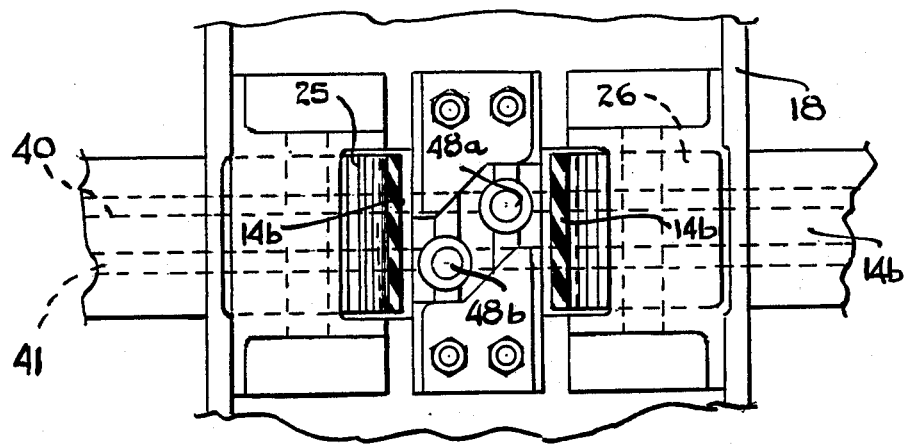
FIG. 4 is a cross sectional view taken along the plane indicated by 4—4 in FIG. 3.
Figure 3:
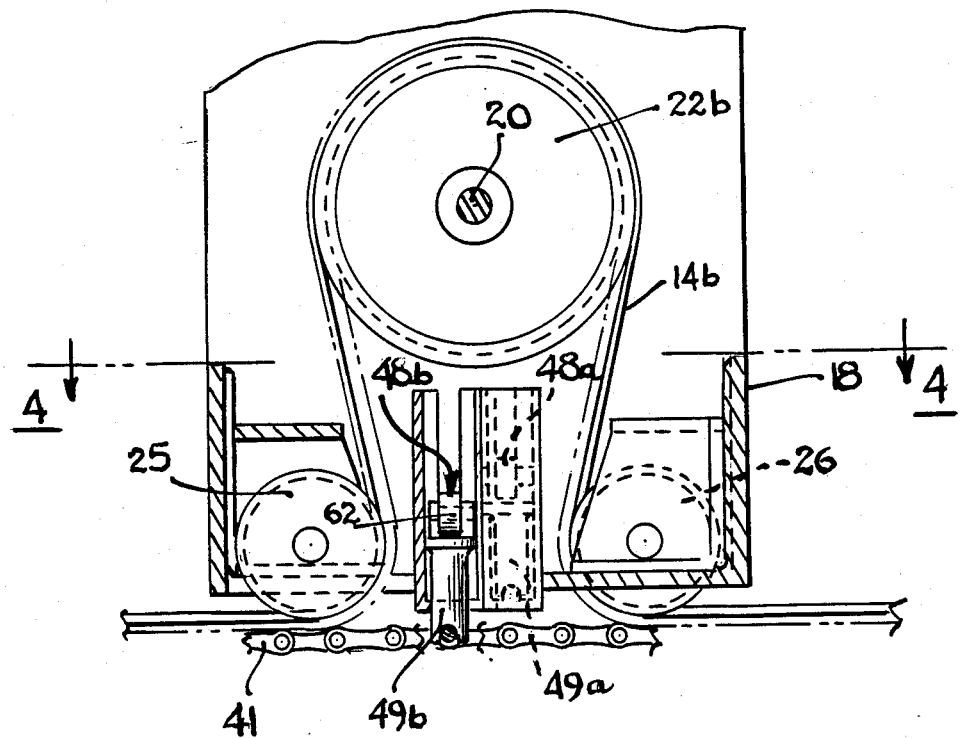
FIG. 3 is a cross sectional view taken along the plane indicated by 3—3 in FIG. 2.
Figure 5:
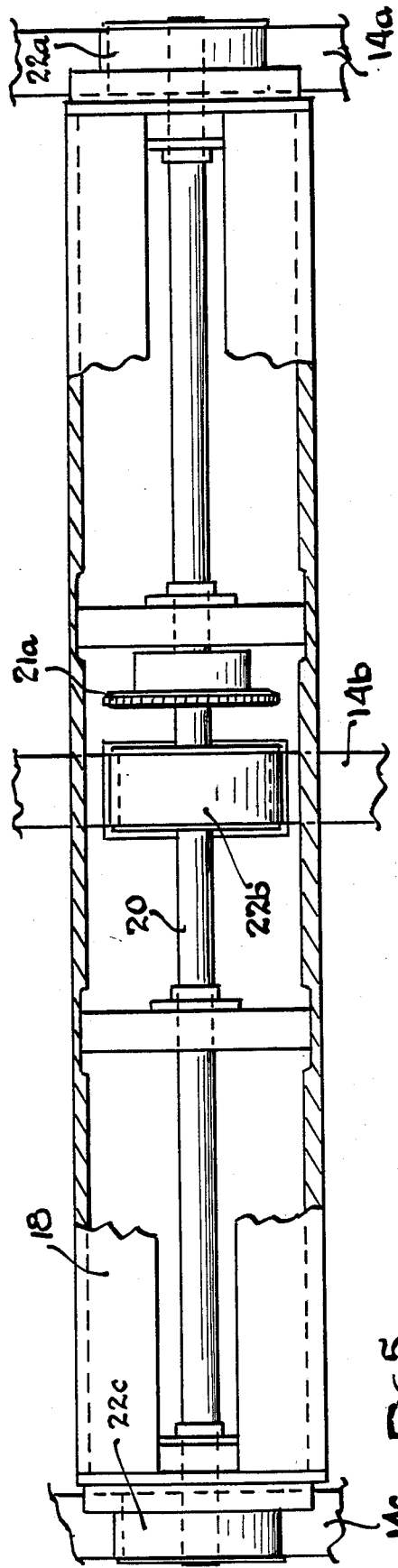
FIG. 5 is a top plan view of the main drive panel of the preferred embodiment.
Figure 6:
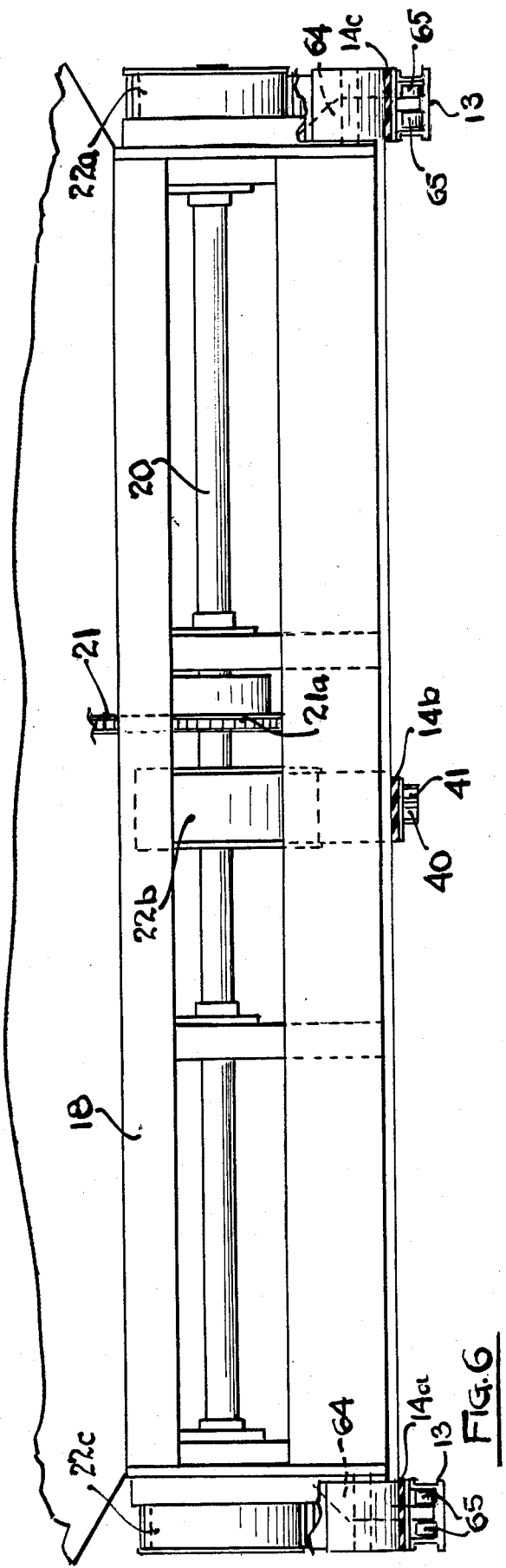
FIG. 6 is a side elevational view of the main drive panel.

As shown in FIG. 9 end panel 30 is attached to chain 40 at all times by means of connector lug 51. Belt 14c fits under idler wheels 25 and 26 and runs over toothed trolley wheel 31a as already described. Referring particularly to FIGS. 2-4, when solenoid 47a is actuated by electrical control means, cam member 48b is driven by the solenoid in the direction of arrow 60, this cam member abutting against actuator wheel 62 and driving lug 49b downwardly against the action of spring 64, as indicated in FIG. 3. In this downward position lug 49 engages chain 41. Lug 49b is attached to drive panel 18 such that when drive panel 18 is driven to the right (with reference to FIG. 1), the chain will pull end panel 30 along with drive panel 18 to push whatever cargo may be in its path to the unloading position. Solenoid 47b can be 6 actuated in similar fashion to drive cam member 48a similar to cam member 48b, thereby driving lug member 49a (shown in phantom in FIG. 4) into engagement with chain 40. In this manner, cargo can be unloaded from either end of the vehicle compartment, merely by actuation of the proper solenoid and proper directional actuation of motor 19 to drive the main drive panel in one direction or the other, as may be desired.

While the invention has been described and illustrated in detail, it is to be clearly understood that this is intended by way of illustration and example only and not to be taken by way of limitation, the spirit and scope of the invention being limited only by the terms of the following claims.

I claim:

1. A cargo handling system for use in moving cargo along the system's floor panel structure which rests on the floor of the loading compartment of a vehicle, to effect the loading and unloading of said compartment comprising:

a main drive panel mounted for longitudinal movement along the floor panel structure;

similar fore and aft end panels mounted for longitudinal movement along the floor panel structure;

belt means extending longitudinally along said floor panel structure and anchored thereto;

drive means mounted on said main panel for driving said main panel in trolley-like fashion along said belt means; and means for selectively connecting said end panels to the main drive panel such that one or the other of said end panels is drawn by said main drive panel;

said main drive panel while disconnected from said end panels being operable to drive said cargo in a first direction or in a direction opposite to said first direction in loading the cargo in said compartment;

said main drive panel while connected to one or the other of said end panels being operable to draw the connected panel so that the connected panel drives cargo in said compartment in unloading said cargo.

2. The system of claim 1 wherein said belt means comprises a plurality of toothed belts and said drive means comprises a drive motor, a toothed trolley wheel for each of said toothed belts, the teeth of each of said wheels engaging the teeth of the associated belt and means for coupling the drive motor to said wheels to effect the rotation of said wheels.

3. The system of claim 2 wherein said means for selectively connecting said end panels to the main drive panel comprises an endless drive line for each of said end panels, each of said lines being connected to its associated end panel and means for selectively connecting the main drive panel to one or the other of said drive lines.

4. The system of claim 2 and further including a pair of interconnected toothed trolley wheels mounted for free wheeling rotation on opposite ends of each of said end panels, the teeth of each of said wheels engaging the teeth of one of said belts, thereby to directionally stabilize said panels.

5. The system of claim 3 wherein said endless drive line comprises a sprocket chain and said means for selectively connecting the main drive panel to one of said chains comprises a lug for each chain connected to said main drive panel and solenoid means for selectively driving each of said lugs into engagement with its associated chain.

6. In a cargo handling system for use in moving cargo along the floor panel structure which rests on the floor of the loading compartment of a vehicle to effect the loading and unloading of said compartment, said system including rollers mounted along said floor panel structure along which the cargo is moved:

a main drive panel mounted for longitudinal movement along said floor;

similar fore and aft end panels mounted for longitudinal movement along said floor;

a plurality of flexible belts having teeth therealong, said belts being mounted longitudinally along said floor panel structure and anchored to said structure at each of the opposite ends thereof;

a set of interconnected toothed trolley wheels mounted for rotation on each of said panels, the teeth of each of said wheels engaging the teeth of one of said belts;

motor means for rotatably driving the wheels of said main drive panel in a first direction or a direction opposite to said first direction thereby to drive said main panel longitudinally along said belts;

an endless drive line for each of said end panels, said drive lines extending longitudinally along said floor between said end panels and said main panel, each of said drive lines being connected to a separate one of said end panels, and means for selectively connecting said main panel to one or the other of said drive lines;

whereby said main drive panel while disconnected from said drive line operates to drive cargo in a first direction or a direction opposite said first direction in loading cargo in said compartment, and while connected to one or the other of said drive lines operates to draw the end panel connected thereto to drive cargo in unloading said cargo from said compartment.

7. The system of claim 6 wherein there are a pair of interconnected trolley wheels mounted on each of said end panels, the wheels of each pair thereof being mounted on the opposite ends of the associated end panel, each of said wheels freely riding along an associated one of said belts thereby providing directional stabilization of said end panels.

8. The system of claim 6 wherein said motor means comprises an electric motor, a drive shaft rotatably supported on said main drive panel on which said main drive panel trolley wheels are fixedly mounted and means for coupling the output of said motor to said drive shaft.

9. The system of claim 6 wherein said drive lines include a section of sprocket chain, the means for selectively connecting said main panel to each of said drive lines comprising a lug adapted to engage said chain and a solenoid for driving said lug into engagement with said chain.

* * * * *